United States Patent
Kakadia et al.

(10) Patent No.: US 9,131,072 B1
(45) Date of Patent: Sep. 8, 2015

(54) DYNAMIC AUCTIONING OF UNUSED NETWORK CAPACITY

(71) Applicant: Verizon Patent and Licensing Inc., Basking Ridge, NJ (US)

(72) Inventors: Deepak Kakadia, Antioch, CA (US); Thaddeus J. Dudziak, Pleasanton, CA (US); Thomas H. Tan, San Jose, CA (US); Raymond So, San Ramon, CA (US); Maria G. Lam, Oakland, CA (US); Manish Sharma, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 41 days.

(21) Appl. No.: 14/193,756

(22) Filed: Feb. 28, 2014

(51) Int. Cl.
 *H04M 11/00* (2006.01)
 *H04M 15/00* (2006.01)
 *H04W 4/24* (2009.01)

(52) U.S. Cl.
 CPC .......... *H04M 15/8016* (2013.01); *H04M 15/66* (2013.01); *H04M 15/8027* (2013.01); *H04W 4/24* (2013.01)

(58) Field of Classification Search
 CPC ... G06Q 30/08; G06Q 30/06; G06Q 30/0275; G06Q 10/03; G06Q 10/06315; H04W 16/14; H04W 72/00; H04W 72/04; H04W 72/0453; H04W 28/0263; H04W 36/0072; H04W 48/06; H04W 72/02; H04L 12/145
 USPC ......................................................... 455/406
 See application file for complete search history.

(56) References Cited

U.S. PATENT DOCUMENTS

| | | | |
|---|---|---|---|
| 2002/0078206 A1* | 6/2002 | Boies et al. | 709/226 |
| 2006/0007955 A1* | 1/2006 | Kotzin | 370/467 |
| 2006/0167703 A1* | 7/2006 | Yakov | 705/1 |
| 2007/0133428 A1* | 6/2007 | Taylor et al. | 370/252 |
| 2012/0014332 A1* | 1/2012 | Smith et al. | 370/329 |
| 2013/0301609 A1* | 11/2013 | Smith et al. | 370/331 |

\* cited by examiner

*Primary Examiner* — Kwasi Karikari

(57) ABSTRACT

A network device receives utilization information, for an infrastructure network, that provides data for individual segments of the infrastructure network. Based on the data for the individual segments, the network device generates a costing matrix that includes prices for each segment of the individual segments. The network device identifies particular segments of the infrastructure network associated with an end-to-end path for a subscriber and generates pricing of different service levels for the end-to-end path. The pricing is based on the costing matrix and a particular time period. The network device provides, to the subscriber, a user interface that includes service plan options with the pricing of different service levels for the end-to-end path and receives, via the user interface, a selection of one of the service plan options. The network device sends instructions to provision the infrastructure network to support the selected service plan option.

20 Claims, 9 Drawing Sheets

| SEGMENT ID | SEGMENT UTILIZATION | SEGMENT COST FACTOR | SEGMENT COST |
|---|---|---|---|
| S1 | 10% | 1.0 | $1.00 |
| S2 | 90% | 1.0 | $9.00 |
| S3 | 10% | 1.5 | $1.50 |
| S4 | 30% | 2.0 | $6.00 |
| S5 | 40% | 1.0 | $4.00 |
| S6 | 20% | 1.2 | $2.40 |
| ... | | | |
| Sn | | | |

FIG. 5

DYNAMIC AUCTIONING OF UNUSED NETWORK CAPACITY

BACKGROUND

Mobile wireless communication systems have finite resources which are typically shared among multiple users accessing different services. Such services may include, for example, video streaming and/or interactive messaging, e-mail, text messaging, web surfing, etc. Applications using different services can place varied demands on the wireless network. To address these demands, Quality of Service (QoS) techniques attempt to partition available network resources to provide an acceptable quality of experience for all of the users and their respective applications. For example, a differentiated services model utilizes DSCP (Differentiated Services Code Points) in packet headers so that packets can be classified and forwarded to achieve required service parameters.

Service providers typically provision network resources to support QoS subscriptions for subscribers based on a static level. Once a service provider configures a particular subscriber with a particular QoS level (e.g., "Bronze," "Silver," "Gold," etc.) that QoS configuration and provisioning may remain fixed until a disruptive QoS reconfiguration is executed. During peak use times, these reserved resources ensure that contracted services levels are met.

BRIEF DESCRIPTION OF THE DRAWINGS

FIG. 5 is an exemplary data structure that may be generated by the dynamic costing engine of FIG. 3;

DETAILED DESCRIPTION OF PREFERRED EMBODIMENTS

Figure 1:
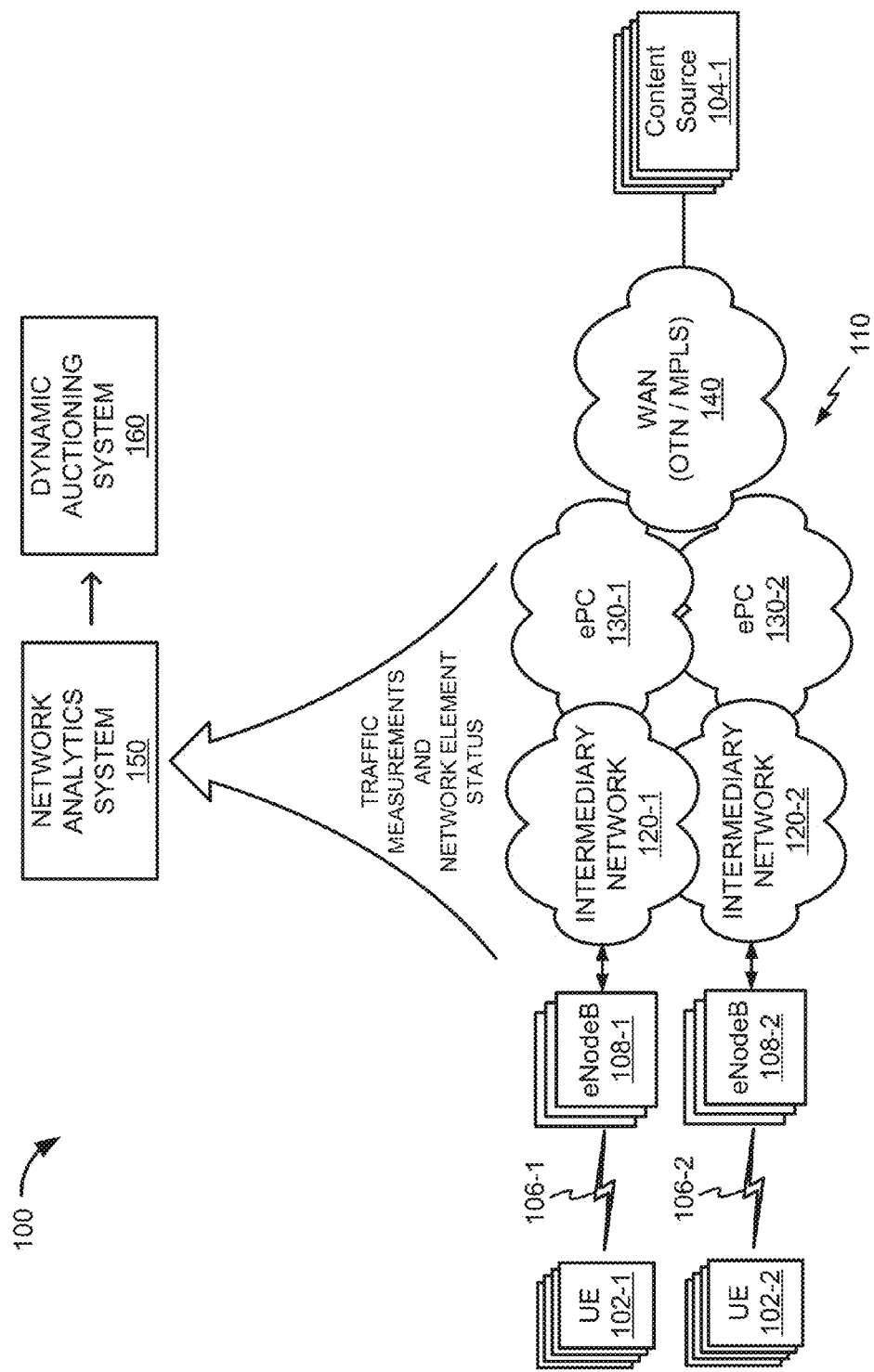
FIG. 1 is a block diagram illustrating an exemplary network environment in which systems and/or methods described herein may be implemented.

The following detailed description refers to the accompanying drawings. The same reference numbers in different drawings may identify the same or similar elements.

Systems and methods described herein enable wireless service providers to identify, offer, and monetize unused network capacity that would otherwise be wasted. The systems and methods allow unused capacity to be auctioned off and/or offered to bidders and may further allow a subscriber to indicate a need for a particular service level, at a premium, for a short period (rather than invoke, for example, a semi-permanent upgraded service that can be changed less frequently). In conventional systems, there is no way for service providers to monetize unused bandwidth to the highest bidder. Also, in conventional systems there is no way for a subscriber to enroll in a certain QoS level and dynamically change to a different QoS level for a temporary period. For example, a subscriber enrolled in a very low cost service, may for a brief episode, such as an important video conference call of 1 hour, require a higher QoS level. Implementations described herein may enable the subscriber to easily modify their QoS level temporarily using a self-service portal approach.

According to one implementation, a network device may receive utilization information (also referred to herein as capacity information) for an infrastructure network. The utilization information provides data for individual segments of the infrastructure network. Based on the data for the individual segments, the network device may generate a costing matrix that includes prices for each segment of the individual segments. The network device may identify particular segments of the infrastructure network associated with an end-to-end path for a subscriber and may generate pricing for different service levels for the end-to-end path. The pricing may be based on the costing matrix and a particular time period of interest to the subscriber. The network device may provide, to the subscriber, a user interface that includes service plan options with the pricing of different service levels for the end-to-end path and may receive, via the user interface, a selection of one of the service plan options. Upon receiving the selection, the network device may send instructions to automatically provision the infrastructure network to support the selected service plan option.

As used herein, a segment within a network (sometimes referred to herein as a "network segment") may be defined as path within the network between two or more network elements. One example of a segment within a Long Term Evolution (LTE) evolved packet Core (EPC) is an S5/S8 connection between a packet data network (PDN) gateway (PGW) and a serving gateway (SGW). A network element may be defined as any device within the network which provides some network functionality, such as, for example, any type of gateway, router, switch, server, mobile device, base station, etc. A network location may be defined as an identifiable point within the network, which may be either in a segment or a network element. As used herein, end-to-end (E2E) may refer to any path which traverses the network between two endpoints which exchange packets, such as, for example, the communications path between two mobile devices during a voice call.

An application data flow (ADF) may be defined as a plurality of packets associated with a particular application type. Each application type may require different networking resources which can be characterized by a variety of QoS parameters indicating the relative priorities of the packets. These priorities can be based upon the resource requirements and latency sensitivities of the application associated with the ADF. Using the QoS parameters, ADFs may be divided into different service categories based on their relative priority. For example, buffered video streaming and email can be classified under the same QoS parameter, and thus receive the same level of service. Different QoS parameters may be used at different networking levels and/or locations within the network. For example, at the network layer (Layer 3), adjusting Differentiated Services Code Point (DSCP) markings may be used to control packet flow. In another example, at the data link layer (Layer 2), altering 802.pq priority markings may be used to adjust packet flow. Additionally, in the Radio Access Network (RAN), QoS class identifiers (QCIs) may be adjusted to control packet flow. Embodiments provided herein may select among the different QoS parameters, and/or their associated network locations, to determine how to have the greatest influence on improving the flow of the affected ADF while ensuring other ADFs maintain conformance with their E2E performance requirements. In other implementations, methodology described herein may be used to identify idle/unused capacity in a network which can be offered to customers in measured allotments at different rates.

FIG. 1 depicts a diagram of an exemplary network environment 100 in which systems and methods described herein may be implemented. As shown in FIG. 1, network environment 100 may include user equipment (UE) 102 (as used herein, collectively referred to as "UE 102" and individually as "UE 102-$x$"), content sources 104 (as used herein, collectively referred to as "content sources 104" and individually as "content source 104-$x$"), evolved Node Bs (eNodeB) 108 (collectively referred to as "eNodeB 108" and individually as "eNodeB 108-$x$"), an infrastructure network 110, a network analytics system 150, and a dynamic auctioning system 160. Infrastructure network 110 may further include intermediary networks 120 (collectively referred to as "intermediary network 120" and individually as "intermediary network 120-$x$"), an evolved packet core (EPC) 130 (collectively referred to as "EPC 130" and individually as "EPC 130-$x$"), and a wide area network 140. For ease of explanation, only a limited number of network elements are shown in network environment 100 depicted in FIG. 1. However, it should be understood that a greater number of network elements may be part of network environment 100, including other types of known network entities not illustrated in FIG. 1. Other embodiments may include additional or different network entities in alternative configurations than which are exemplified in FIG. 1. Additionally, embodiments described herein may be presented within the context of the Long Term Evolution (LTE) wireless standard for ease of explanation. However, aspects of the invention are not restricted to the LTE standard, and may be applied to other networking standards, such as, for example, LTE Advanced, Global System for Mobile Communications (GSM), Universal Mobile Telecommunications System (UMTS), IS-2000, etc.

UEs 102 may communicate with infrastructure network 110 through eNodeB 108 over a wireless channel 106 (collectively referred to as "wireless channel 106" and individually as "wireless channel 106-$x$"). Infrastructure network 110 may exchange ADFs between two or more UEs 102, and/or with one or more content servers (e.g., content source 104-1), through one or more eNodeBs 108. Each eNodeB 108 may interface with the infrastructure network 110 through an intermediary network 120. While FIG. 1 only shows one eNodeB 108-1, 108-2 connected to each intermediary network 120-1, 120-2, respectively, an intermediary network 120-$x$ may be functionally coupled to a plurality of eNodeBs 108. According to an embodiment, one or more eNodeBs 108, which may be functionally interconnected to each other and can also be separately connected to intermediary network 120, may be referred to as the evolved UMTS Terrestrial Radio Access Network (eUTRAN). In other embodiments using different wireless standards, the eNodeBs may be referred to as base stations and the eUTRAN referred to simply as a Radio Access Network (RAN). The intermediary network 120 may interface to EPC 130 which handles the ADFs over user plane traffic (e.g., Access Stratum functionality), and perform control operations for eNodeBs 108 and UEs 102 based at least in part on control plane signals (e.g., Non-Access Stratum functionality). Each EPC 130 may interface with each other to exchange ADFs through a WAN 140. WAN 140 may include a plurality of networks which can span large areas, thus permitting UEs 102 to communicate over practically any geographical distance.

Network analytics system 150 may be may communicate with network elements throughout the network environment 100 to manage ADFs from one network endpoint to another, thus providing end-to-end networking management for any ADF. Network analytics system 150 may receive traffic measurements and network element status from UEs 102, eNodeBs 108, and/or network elements within intermediate networks 120, EPCs 130, and/or WAN 140. Based upon the traffic measurements and/or the network element status received, network analytics system 150 may measure the instantaneous QoS capacity in infrastructure network 110 and provide the QoS capacity to dynamic auctioning system 160 for use by customers.

Dynamic auctioning system 160 provides a customer-facing self-service portal that processes network utilization (e.g., capacity) information from network analytics system 150 and offer unused network capacity to subscribers on demand. According to implementations described herein, dynamic auctioning system 160 may convert network status information from dynamic auctioning system 160 into quantifiable network capacity measures that can be monetized. Dynamic auctioning system 160 may dynamically calculate pricing for desired service levels and time periods identified by the subscriber.

Figure 2:
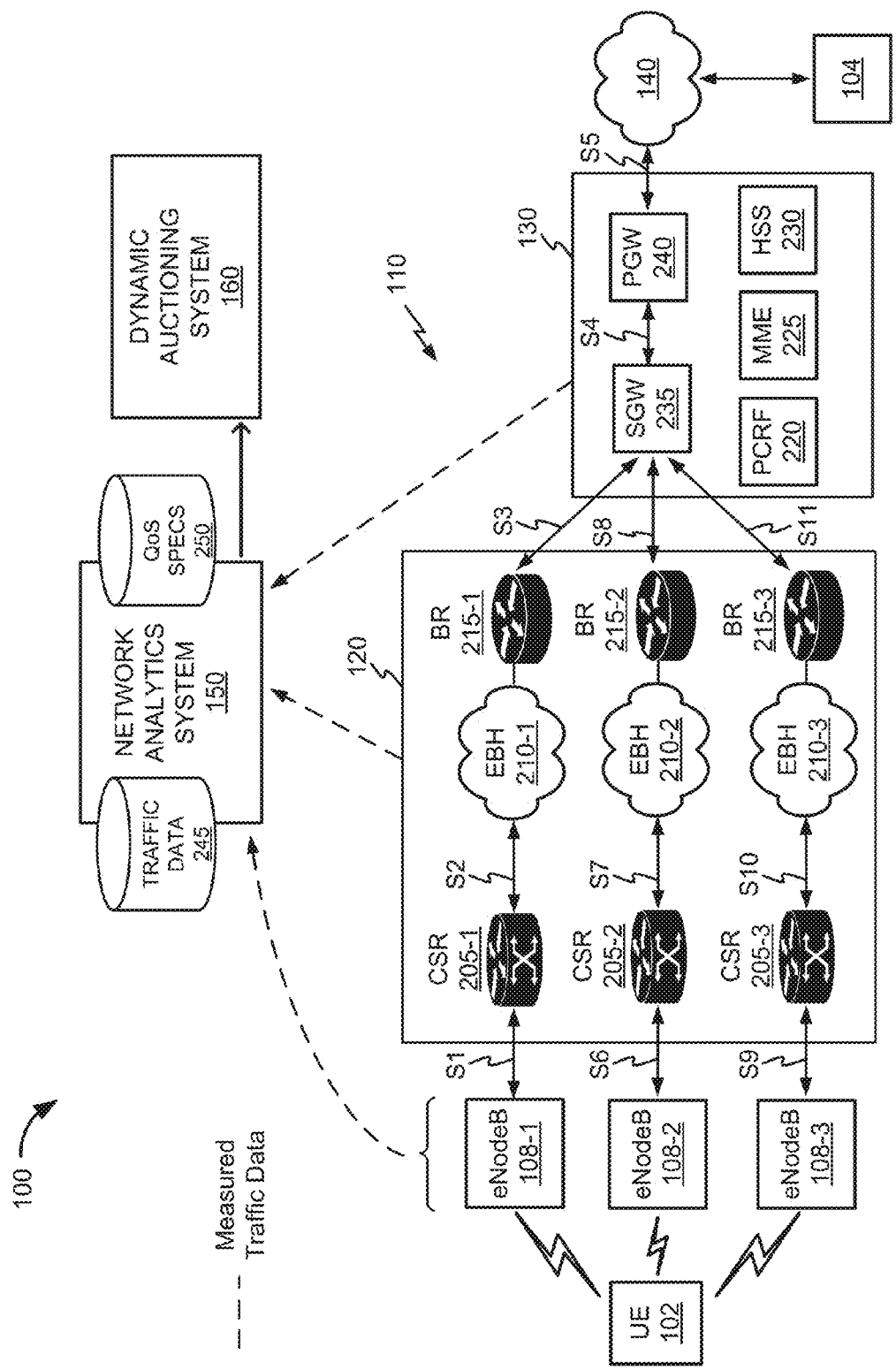
FIG. 2 is a block diagram depicting exemplary details of the network environment shown in FIG. 1.

FIG. 2 is a block diagram depicting exemplary details of network environment 100 shown in FIG. 1, which includes UE 102, content source 104, eNodeB 108, infrastructure network 110, network analytics system 150, and dynamic auctioning system 160. Intermediary network 120 of infrastructure network 110 may further include a cell site router (CSR) 205 (collectively referred to as "CSR 205" and individually as "CSR 205-$x$"), an Ethernet backhaul (EBH) network 210 (collectively referred to as "EBH 210" and individually as "EBH 210-$x$", a backhaul router 215 (collectively referred to as "BR 215" and individually as "BR 215-$x$"). EPC 130 of infrastructure network 110 may further include a policy and charging rules function (PCRF) 220, a mobility management entity (MME) device 225, a home subscriber server (HSS) 230, a serving gateway (SGW) 235, and a packet gateway (PGW) 240. E2E communications through network elements of infrastructure network 110 may be conducted through segments, such as segments S1 through S11, as indicated in FIG. 2.

FIG. 2 further shows that network analytics system 150 may utilize a number of data sets associated with network environment 100, which can include traffic data storage 245 and QoS specifications storage 250. For ease of explanation, only a limited number of network elements and segments are shown in the network environment 100 depicted in FIG. 2. However, it should be understood that a greater number of network elements and segments may be part of network environment 100, including other types of known network entities not illustrated. Other embodiments may include additional or different network entities in alternative configurations than which are exemplified in FIG. 2.

Referring to intermediary network 120, CSR 205 may mange the connection between eNodeB 108 and the EBH network 210. CSR 205 may also be used to manage connections with legacy base stations which may be present at the same site as eNodeB 108. Typically, one CSR 205 may be used per eNodeB 108 to connect with EBH network 210. EBH 210 may interface with a plurality of eNodeBs 108 and serve as an aggregation point for a eUTRAN to connect with the EPC (e.g., EPC 130). Each eNodeB 108 may connect through a separate CSR 205. EBH network 210 may be configured to support high bandwidth transport and can include wavelength-division multiplexing (WDM) optical networking components. BR 215 may include one or more routers or other network devices that provide an entry and/or an exit to and from private intermediary network 120.

Referring to EPC 130, PCRF 220 provides policy control decision and flow based charging control functionalities. PCRF 220 may provide network control regarding service data flow detection, gating, QoS and flow based charging, etc. PCRF 220 may determine how a certain service data flow shall be treated, and may ensure that user plane traffic mapping and treatment is in accordance with a user's subscription profile (including a temporary upgrade profile).

MME device 225 may implement control plane processing for infrastructure network 110. For example, MME device 225 may implement tracking and paging procedures for UE 102, may activate and deactivate bearers for UE 102, may authenticate a user of UE 102, and may interface to non-LTE radio access networks. A bearer may represent a logical channel with particular QoS requirements, and can be used in some embodiments to control packet flows as described herein. MME device 225 may also select a particular SGW 235 for a particular UE 102. A particular MME device may interface with other MME devices (not shown) in EPC 130 and may send and receive information associated with UEs 102, which may allow one MME device to take over control plane processing of UEs 102 serviced by another MME device, if the other MME device becomes unavailable.

HSS device 230 may store information associated with UEs 102 and/or information associated with users of UEs 102. For example, HSS device 230 may store user profiles that include authentication and access authorization information.

SGW 235 may provide an access point to and from UE 102, may handle forwarding of data packets for UE 102, and may act as a local anchor point during handover procedures between eNodeBs 108. SGW 235 may also be configured to measure traffic data 245 flowing through SGW 235. Additionally, in one embodiment, SGW 235 may include a tracking mechanism (e.g., a packet trace trap) at an interface with PGW 240 to measure traffic data flowing between SGW 235 and PGW 240.

PGW 240 may function as a gateway to WAN 140. PGW 240 may include a tracking mechanism to measure traffic data 245 between PGW 240 and WAN 140. WAN 140 may include, for example, an IP Multimedia Subsystem (IMS) network, which may provide voice and multimedia services to UE 102, based on Session Initiation Protocol (SIP). A particular UE 102, while connected to a single SGW 235, may be connected to multiple PGWs 240 (e.g., one for each packet network with which UE 102 communicates).

As noted above in the description of FIG. 1, UEs 102 may communicate with eNodeB 108 over a wireless channel to exchange ADFs. The eNodeB 108 may then exchange ADFs with intermediary network 120 over a standard connection. Specifically, in an embodiment, eNodeB 108 may interface with CSR 205 to exchange ADFs with EBH network 210. EHB 210, which may also interface with a plurality of eNodeBs 108 (not shown), is capable of handling the traffic from multiple eNodeBs 108, and may include optical networks for exchanging ADFs with BR 215 to eventually exchange ADFs with ePC 130.

Network analytics system 150 may measure traffic data throughput for the entire network at a granular level, which may include measuring traffic at selected segments (e.g., any or all of segments S1 through S11 of FIG. 2) and/or network elements. In one implementation, raw traffic data may be collected using one or packet trace traps (PTTs) placed within network segments and/or across selected network elements to measure traffic flow. As shown in FIG. 2, traffic data may be measured at any element and/or segment and subsequently stored in traffic data storage 245 (traffic collection and storage being represented by coarse dashed lines shown in FIG. 2). Measurements at segments and/or network elements may be combined along the paths of ADFs, so that an ADF may be identified and tracked E2E across the entire network using the measured traffic data. Thus, given the granularity of the measurements, the network analytics system 150 may use the measured traffic data 245 to perform the E2E tracking of ADFs on a per segment basis. Because each ADF may be uniquely identified, it may also be tracked on per subscriber, per QoS basis, and/or per application basis. An ADF may be uniquely identified using a "5-tuple" identifier, which may include an internet protocol (IP) source address, and IP destination address, a source port number, a destination port number, and protocol information (e.g., TCP or UDP).

Network analytics system 150 may further use QoS specifications storage 250 to determine whether the measured ADFs are within specification in terms of bandwidth, packet delay, etc. QoS specifications may be determined prior to network management, which may be determined using prior traffic measurements, predictive models, or a combination thereof. For example, QoS specifications may be determined using statistical characterizations of the measured traffic data before network analytics system 150 performs management operations. By comparing the measured traffic data 245 with the QoS specifications storage 250, network analytics system 150 may pinpoint network location(s) where traffic congestion occurs for each segment.

Traffic data 245 may represent individual packet measurements which may be correlated to their associated ADFs. Packets may be counted within segments and/or network elements using PTTs, and their speeds derived using packet time tags. For example, traffic data passing through a particular element may be measured by PTTs in segments surrounding that particular network element. In alternate embodiments, PTTs may be placed in a network element (such as, for example, in UE 102) to directly measure packet flow in the network element itself.

Specifications in QoS specifications storage 250 may be determined prior to being used by network analytics system 150, and can be derived using prior traffic measurements, existing QoS industry/supplier provided specifications, predictive models, or any combination thereof. The measured traffic 245 may be used in an ongoing manner to update QoS specifications storage 250 and keep them current. Specifications in QoS specifications storage 250 may include packet delays, jitter, response time, throughput, bandwidth, reliability values such packet loss, time to failure, etc. Moreover, specifications in QoS specifications storage 250 can be provided at a much finer level of detail than conventional QoS specifications. For example, instead of simply being delineated by application type, specifications in QoS specifications storage 250 may be specified for a particular network topology, and thus be specified on a per segment basis, in addition to being specified on a per QoS level, and/or per application type basis. Additionally, specifications in QoS specifications storage 250 may include actual E2E ADF specifications on a per-QoS and/or per-application type basis.

According to implementations described herein, raw data from network analytics system 150 (e.g., traffic data 245, specifications in QoS specifications storage 250, etc.) may be provided to dynamic auctioning system 160 at predetermined intervals (e.g., every second or few seconds) to provide a real-time or near-real-time status of infrastructure network 110. Dynamic auctioning system 160 may receive the data in the form of a table that tracks each segment (or particular relevant segments) on a per segment basis throughout infrastructure network 110 for each QCI/QoS level traversing the segment. The segment data may include actual measured packet delay moving averages (e.g., from on the previous few minutes) based on the latest current period of measurements and the packet error rates (PER, sometimes referred to as packet error loss rates). The packet delay and PER will be analyzed against the actual upper bounds based on traffic specifications and QoS Queue buffer capacities (e.g., the PER and packet delay budget (PDB) for a particular QCI) to measure the amount of excess capacity. Generally, the more unused capacity in infrastructure network 110, the lower the price that will be charged to subscribers for temporary upgrades. The dynamic pricing enables a service provider for infrastructure network 110 to maximize profits and monetize unused capacity which is highly perishable. Thus, dynamic auctioning system 160 can enable the highest bidding subscriber to pay for what it values when using a tailored custom pricing service model.

Figure 3:
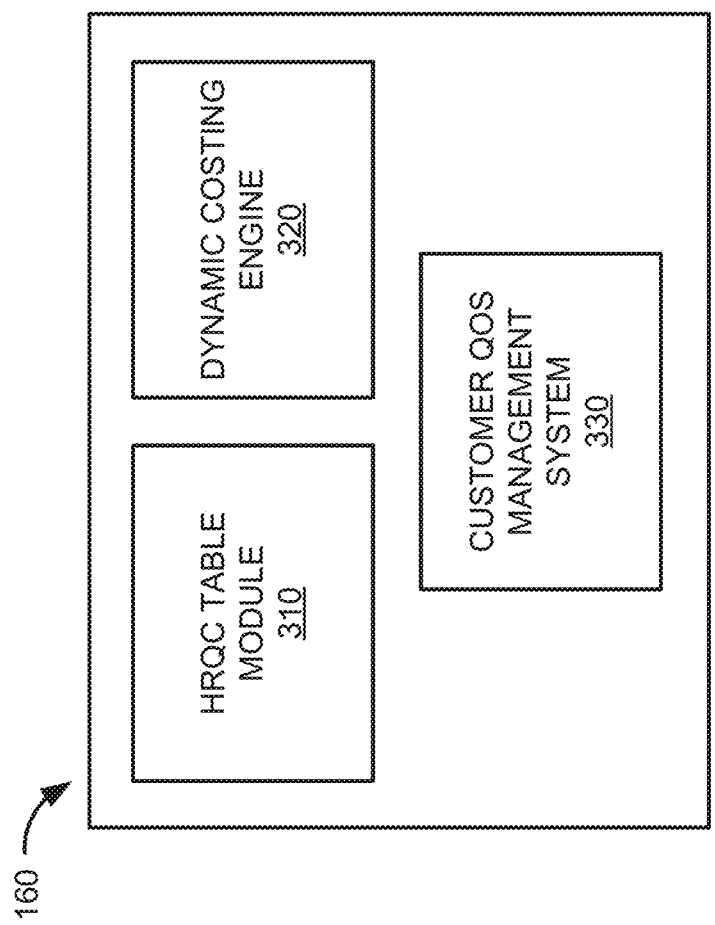
FIG. 3 is a block diagram of exemplary components of the dynamic auctioning system illustrated in FIG. 1.

FIG. 3 is a block diagram of exemplary components of dynamic auctioning system 160. As shown in FIG. 3, dynamic auctioning system 160 may include a high resolution QoS capacity (HRQC) table module 310, a dynamic costing engine 320, and a customer QoS management system 330.

Figure 4:
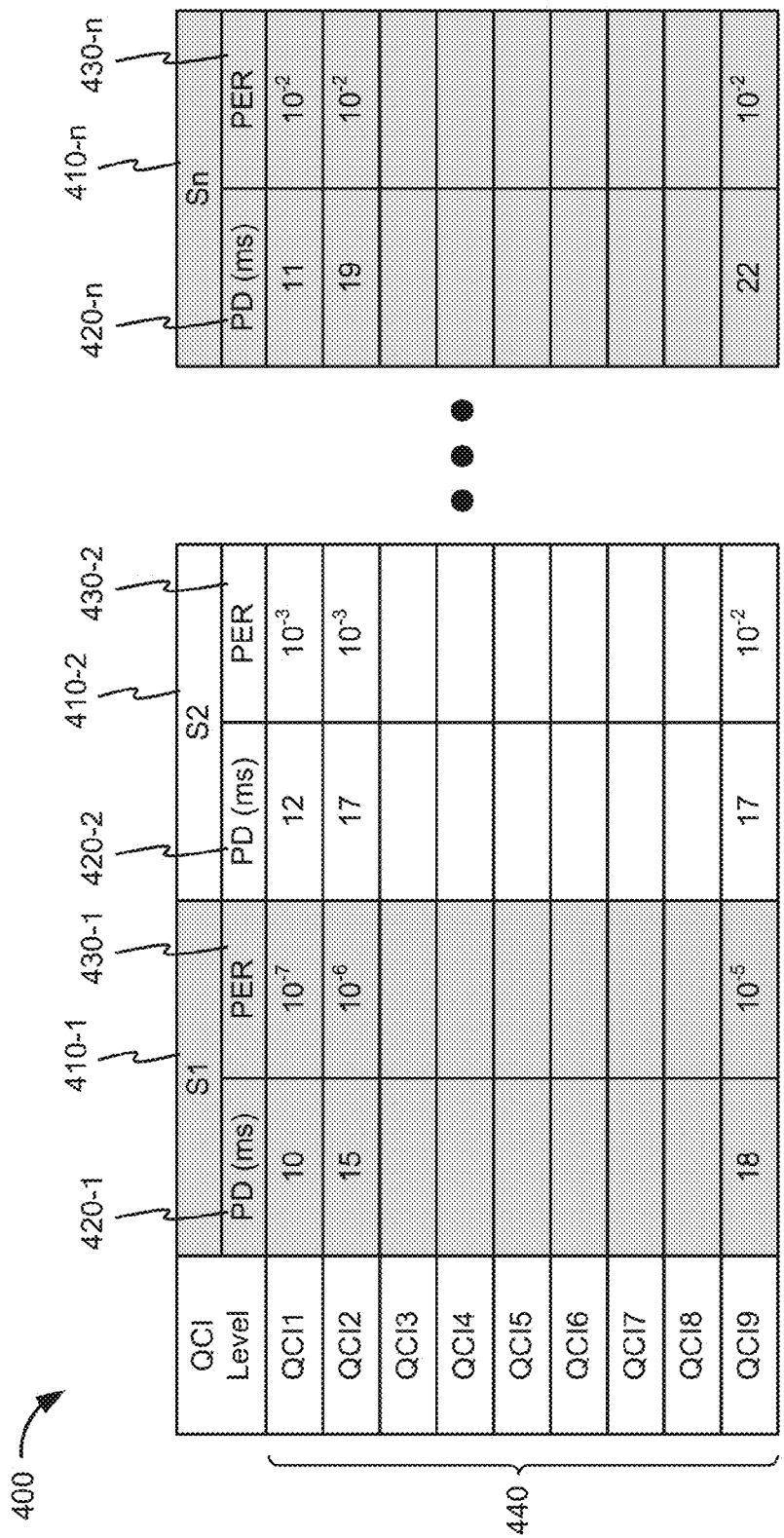
FIG. 4 is an exemplary data structure that may be provided by the high resolution QoS capacity (HRQC) table module of FIG. 3.

HRQC table module 310 may communicate with network analytics system 150 to receive new and updated data from network analytics system 150. In one implementation, HRQC table module 310 may use data from network analytics system 150 to generate an HRQC table. In another implementation, HRQC table module 310 may generate and update the HRQC table based on data received from network analytics system 150. FIG. 4 is an exemplary data structure 400 that may be provided by HRQC table module 310.

Referring to FIG. 4, data structure 400 may represent a portion of an HRQC table. Data structure 400 may include multiple network segment fields 410 (as used herein, collectively referred to as "network segment fields 410" and individually as "network segment field 410-$x$"), each including a packet delay (PD) field 420 and a packet error rate (PER) field 430, and a variety of records or entries 440 associated with each of fields 410. In data structure 400, each set of columns for network segment fields 410 may correspond to a separate network segment of infrastructure network 110, and each row of entries 440 may correspond to a different QCI value.

Network segment fields 410 may each include reference to a particular network segment (e.g., one of segments S1-Sn) of infrastructure network 110. In one implementation, each of network segment fields 410 may include a unique identifier for a segment. In another implementation, each segment in network segment fields 410 may be defined by the two network elements at either end of the segment.

Packet delay field 420 may include a measured packet delay value for packets traversing a particular segment. Values in packet delay field 420 may include an indication of the time (e.g., in milliseconds) required for packets to traverse a segment (e.g., from a sending network element to a receiving network element). In one implementation, records in packet delay field 420 may represent a moving average for a relatively short period of time (e.g., a few minutes). For each segment, entries in packet delay field 420 may be separated based on corresponding QCI values for each packet. Thus, for segment S1 (segment field 410-1) in data structure 400, the average delay (e.g., in packet delay field 420-1) for packets with a QCI1 marking during the most recent calculated period would be 10 ms. Similarly, for the same segment S1, the average delay for packets with a QCI2 marking during the most recent calculated period would be 15 ms.

Packet error rate field 430 may include a measure of packet losses over a particular segment. Entries in packet error rate field 430 may include an indication of IP packets that have been processed by a sending network element, but that are not successfully processed/received by a receiving network element. In one implementation, records in packet delay field 420 may represent a moving average for a relatively short period of time (e.g., a few minutes). For each segment, entries in packet error rate field 430 may be separated based on corresponding QCI values for each packet. Thus, for segment S1 (segment field 410-1) in data structure 400, the error rate (e.g., in error rate field 430-1) for packets with a QCI1 marking during the most recent calculated period would be $1*10^{-7}$. Similarly, for the same segment S1, the error rate for packets with a QCI2 marking during the most recent calculated period would be $1*10^{-6}$.

Although FIG. 4 shows exemplary information that may be provided in data structure 400 for a HRQC table, in other implementations, data structure 400 may contain less, different, differently-arranged, or additional information than depicted in FIG. 4. For example, data structure 400 may take the form of a spreadsheet, a database, a flat data structure, etc.

Returning to FIG. 3, values from the HRQC table may be used to identify segments, or groupings of segments, that have unused capacity. More particularly, the measured packet delay values and packet error rate values for each segment may be compared against maximum limits for the segment (e.g., based on traffic specifications, buffer capacities, etc. associated with that segment) to determine available capacity.

Dynamic costing engine 320 may identify costs associated with each network segment in the HRQC table. Costs may include, for example, capacity-based factors and regional factors. Capacity-based factors may identify a price for use of a network segment based on the available capacity of the network segment for a given period. Generally, segments with low use (e.g., high available capacity) may be discounted more than segments with higher use (e.g., low available capacity). Regional factors may include, for example, local costs for network segments. For example, dynamic costing engine 320 may apply pricing multipliers to particular segments based on local labor expenses, lease rates, and other location-based factors.

In one implementation, dynamic costing engine 320 may build/generate and maintain a custom pricing table for a particular subscriber based on the subscriber traffic patterns and location. Dynamic costing engine 320 may create/update the table using capacity information on a per-QCI/QoS and per-segment basis (e.g., from the HRQC table) and segment cost factors. FIG. 5 is an exemplary data structure 500 that may be generated and/or updated by dynamic costing engine 320.

Referring to FIG. 5, data structure 500 may represent a portion of a costing matrix that can be used by dynamic costing engine 320 to generate a customized pricing table for a particular customer. Data structure 500 may include a segment identifier (ID) field 510, a segment utilization field 520, a segment cost factor field 530, a segment cost field 540, and a variety of entries 550 associated with each of fields 510-540. In data structure 500, each set of rows may correspond to a separate network segment of infrastructure network 110.

Segment ID field 510 may include a segment identifier for a particular network segment of infrastructure network 110. Segment utilization field 520 may include a utilization value, such a percentage of available capacity, for the corresponding segment in segment ID field 510. Utilization values in segment utilization field 520 may be determined by dynamic costing engine 320 using, for example, data from the from the HRQC table and known queue sizes/normal delays associated with each segment.

Segment cost factor field 530 may include a cost factors associated with a corresponding segment in segment ID field 510. The cost factor may include, for example, a comparative valuation of equipment, labor, leases, etc., associated with transport over one particular segment compared to another. As an example, a network segment in an urban area with high labor and lease rates may have a higher segment cost factor than a network segment in a rural area with lower labor costs and lease rates.

Segment cost field 540 may include transport pricing for a corresponding segment in segment ID field 510 based on values in segment utilization field 520 and segment cost factor field 530. In one implementation, the pricing for segment cost field 540 may be a derived from an algorithm that applies the corresponding values from segment utilization field 520 and segment cost factor field 530. For example, the segment cost values for each segment in segment cost field 540 may be derived from an algorithm that applies higher prices to more heavily utilized segments and lower prices to less heavily utilized segments. In another implementation, the pricing may be selected from a table or data structure by matching the corresponding values from segment utilization field 520 and segment cost factor field 530.

In the example of FIG. 5, segment "S3" is shown with a segment utilization of "10%" and a segment cost factor of "1.5." The low segment utilization may indicate that segment "S3" is under-utilized and may be a candidate for inclusion in an E2E path offer to subscribers. Conversely, segment "S2" is shown with a segment utilization of "90%" and a segment cost factor of "1.0." The high segment utilization may indicate that segment "S2" is near full utilization and may be included at a premium prices in an E2E path offer to subscribers. Alternatively, segments above a particular utilization threshold (e.g., such as 70%, 80%, or 90%) may not be made available for auctioning/offers.

Although FIG. 5 shows exemplary information that may be provided in data structure 500 for a costing matrix, in other implementations, data structure 500 may contain less, different, differently-arranged, or additional fields than depicted in FIG. 5. For example, data structure 500 may include additional factors to contribute to segment costs.

Returning to FIG. 3, customer QoS management system 330 may provide a self-service portal (e.g., accessed through an application (or "app") or web page) to enable subscribers to indicate a period of time an upgraded service is desired. A subscriber may access the self-service portion using, for example, a user name and password, or other credentials. Using information from HRQC table module 310 and dynamic costing engine 320, customer QoS management system 330 may identify particular subscribers traffic patterns, such as the exact paths they are consuming/using in the network (e.g., infrastructure network 110), the precise network elements on those paths, any excess capacity, and computed pricing models based on how much excess capacity there exists for those periods of time. Customer QoS management system 330 may present to the subscriber (e.g., using UE 102 or another device) a user interface that includes the subscriber's current subscription information and a projection of service conditions (e.g., projection latencies for different types of packets) for a selected period using different service levels (e.g., Bronze, Silver, Gold, etc.). Using the user interface, subscribers may see how network performance under their current plan could (or could not) be improved for the selected performance period using an upgraded level.

Figure 6:
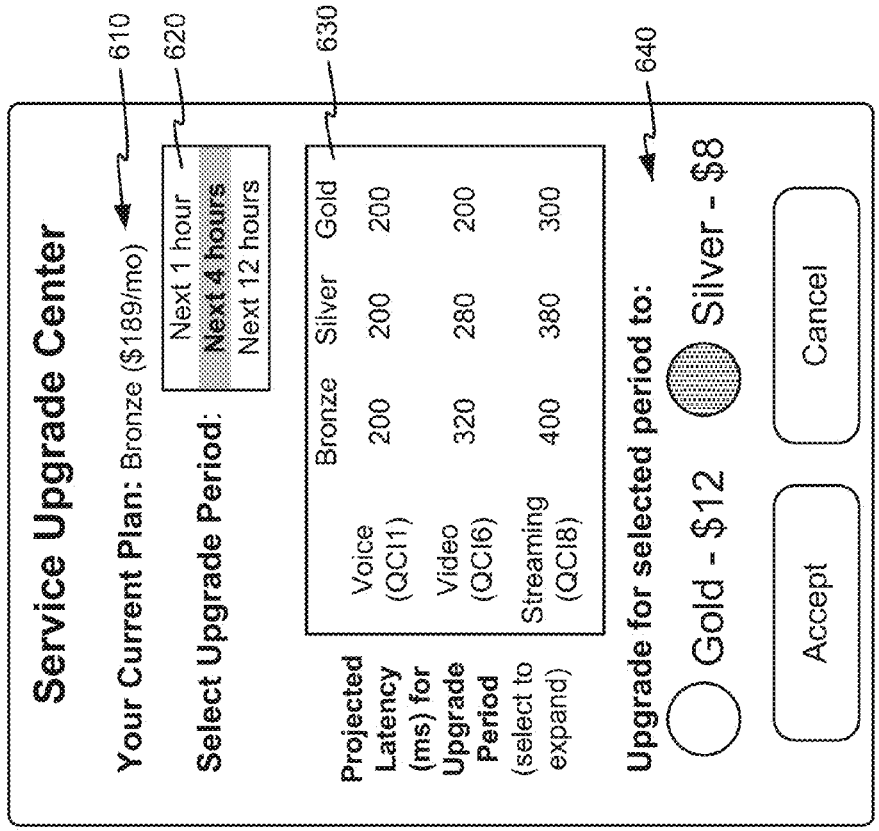
FIG. 6 is an exemplary user interface that may be generated by the customer QoS management system of FIG. 3.

FIG. 6 is an exemplary user interface 600 that may be generated by customer QoS management system 330. As shown in FIG. 6, user interface 600 may include current plan information 610, a period selection section 620, a network performance section 630, and an upgrade selection section 640. Current plan information 610 may include a current service level and cost for a subscriber. Period selection section 620 may include a section to receive user input to identify a period of time for an upgrade. Period selection section 620 may include any of a variety of formats to enable a subscriber to indicate a period of interest. Periods of interest may be pre-defined segments (e.g., next 4 hours), particular times in the future (e.g., 1:00 pm to 5:00 pm), or user-defined intervals.

Still referring to FIG. 6, network performance section 630 may present projected key performance metrics for the subscriber (e.g., over particular network segments) using the subscriber's current service plan (e.g., "Bronze") and other available service plans (e.g., "Silver" and "Gold"). Network performance section 630 may identify how particular types of traffic (e.g., voice, video, streaming, etc., as indicated by a packet's QCI value) would be expected to perform user different plans (Bronze, Silver, Gold, etc.) during the selected period that is indicated in period selection section 620. If a subscriber selected enhanced service for one hour, for example, then customer QoS management system 330 may present statistics averaged over the last hour in network performance section 630. If the subscriber wants enhanced service for one day, then customer QoS management system 330 may present statistics averaged over the last day in network performance section 630. Network performance section 630 can also show, based on analytics, the expected benefit in QoS. As noted above, customer QoS management system 330 may generate information for network performance section 630 based on information from network analytics system 150, HRQC table module 310, and/or dynamic costing engine 320.

As shown in FIG. 6, network performance section 630 may indicate projected E2E latencies (e.g., for the network path of relevance to the subscriber) to indicate the potential benefit (or lack of benefit) available for a service upgrade. For example, a subscriber interested in improving voice services for the selected period finds no advantage to upgrading from Bronze (e.g., 200 ms) to Silver or Gold (e.g., each also 200 ms). However, an upgrade from Bronze to Silver or Gold would provide latency advantages (e.g., lower latencies) for the "video" or "streaming" categories. Different or additional network metrics may be used in other implementations. In other implementations, network performance section 630 may be enlarged or scrollable to show more traffic types (e.g., tied to more or different QCI values) or customized to show traffic types of particular interest. Thus, a subscriber may make an informed cost/benefit decision on the value of a temporary service upgrade.

Upgrade selection section 640 may present an option a subscriber to choose a service upgrade option. Customer QoS management system 330 may generate pricing for available service levels during the selected period based on information from HRQC table module 310 and/or dynamic costing engine 320.

Although FIG. 6 provides one exemplary user interface 600 for implementing a service upgrade, in other implementations, user interface 600 may include additional or different information, and in different formats, than shown in FIG. 6.

Referring again to FIG. 3, in another implementation, customer QoS management system 330 may provide additional user interfaces to allow a user to indicate a price of interest. For example, customer QoS management system 330 may notify a subscriber (e.g., via a text message, email, etc.) when a QoS upgrade price for a particular E2E path drops below a particular level. In another implementation, customer QoS management system 330 may allow a subscriber to indicate a particular recurring time period (e.g., corresponding to a particular event, such as a weekly video-conference period) to be notified of upgrade pricing.

In still another implementation, customer QoS management system 330 may allow subscribers to indicate a price each subscriber is willing to pay (e.g., a bid) for a service upgrade during a particular time period. If network capacity is available, customer QoS management system 330 may evaluate bids from multiple subscribers and provision upgrades for the subscribers with the highest bids (e.g., those most profitable for the service provider).

Although FIG. 3 shows exemplary functional components of dynamic auctioning system 160, in other implementations, dynamic auctioning system 160 may include fewer, different, or additional functional components than depicted in FIG. 3. Alternatively, or additionally, one or more functional components of dynamic auctioning system 160 may perform one or more other tasks described as being performed by one or more other functional components of dynamic auctioning system 160.

Figure 7:
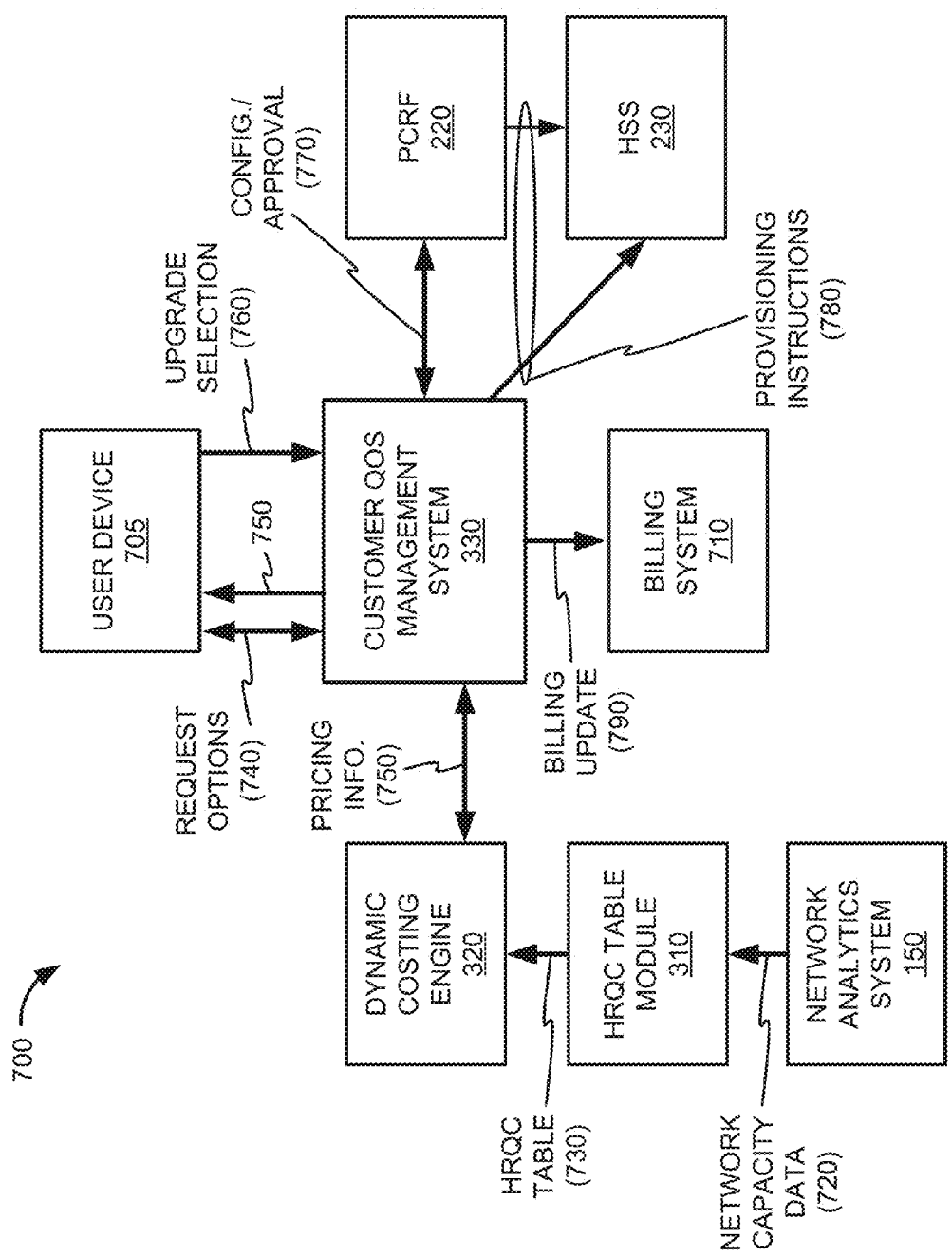
FIG. 7 is a diagram of exemplary communications associated with a portion of the network environment of FIG. 1.

FIG. 7 is a diagram of exemplary communications in a portion 700 of network that includes network environment 100. Network portion 700 may include network analytics system 150, PCRF 220, HSS 230, HRQC table module 310, dynamic costing engine 320, customer QoS management system 330, a user device 705, and a billing system 710. Network analytics system 150, PCRF 220, HSS 230, HRQC table 310, dynamic costing engine 320, and customer QoS management system 330 may include features described above in connection with FIGS. 1-6. User device 705 may include any computing or communication device capable of establishing a network connection with customer QoS management system 330. In one implementation, user device 705 may include UE 102. Billing system 710 may include one or more network devices that manage subscriber billing for services provided via infrastructure network 110. For example, billing system 710 may generate bills to be provided to customers based on regular subscription rates, actual usage levels, and/or temporary service level upgrades as described herein.

As shown in FIG. 7, network analytics system 150 may provide raw and/or tabulated network capacity data 720 to HRQC table module 310. Network capacity data 720 may be updated on a real-time or near-real-time basis to identify network utilization for individual network segments and/or network elements (e.g., in infrastructure network 110). HRQC table module 310 may generate, update, and/or store an HRQC table 730 (e.g., data structure 400) based on network capacity data 720. Dynamic costing engine 320 may retrieve HRQC table 730 and generate a costing matrix (e.g., data structure 500) based on, for example, information from HRCQ table 730 and local cost factors associated with individual network segments in infrastructure network 110.

As indicated by reference 740, a subscriber may use user device 705 to access customer QoS management system 330 to identify service upgrade options for a particular time period (e.g., via user interface 600). Customer QoS management system 330 may identify network segments relevant to a subscriber associated with user device 705 (e.g., based on login information, account information, usage history, etc.) and exchange/obtain information from dynamic costing engine 320 to generate network performance and pricing information 750 for the identified network segments. Network performance and pricing information 750 may include real-time, customized network performance and pricing data for all available service levels relevant to the subscriber's data flow. Customer QoS management system 330 may provide an updated user interface (e.g., user interface 600) to user device 705 that includes network performance and pricing information 750. Based on information in the user interface, the user may select a service upgrade option and user device 705 may provide an upgrade selection 760 to customer QoS management system 330.

Customer QoS management system 330 may receive upgrade selection 760 and, in response may send configuration information (e.g., with the appropriate values to establish the requested QoS in accordance with upgrade selection 760) to PCRF 220 for provisioning and approval, as indicated by reference 770. Upon confirmation from PCRF 220, customer QoS management system 330 may update the new network QoS commitment (e.g., in QoS specifications storage 250) and send provisioning instructions 780 to HSS 230. Additionally, or alternatively, provisioning instructions 780 may be communicated between PCRF 220 and HSS 230. Customer QoS management system 330 may also send a billing update message 790 to billing system 710 to initiate the appropriate changes to the subscriber's billing account.

Although FIG. 7 shows exemplary components of network portion 700, in other implementations, network portion 700 may include fewer components, different components, differently-arranged components, or additional components than depicted in FIG. 7. Alternatively, or additionally, one or more components of network portion 700 may perform one or more other tasks described as being performed by one or more other components of network portion 700.

Figure 8:
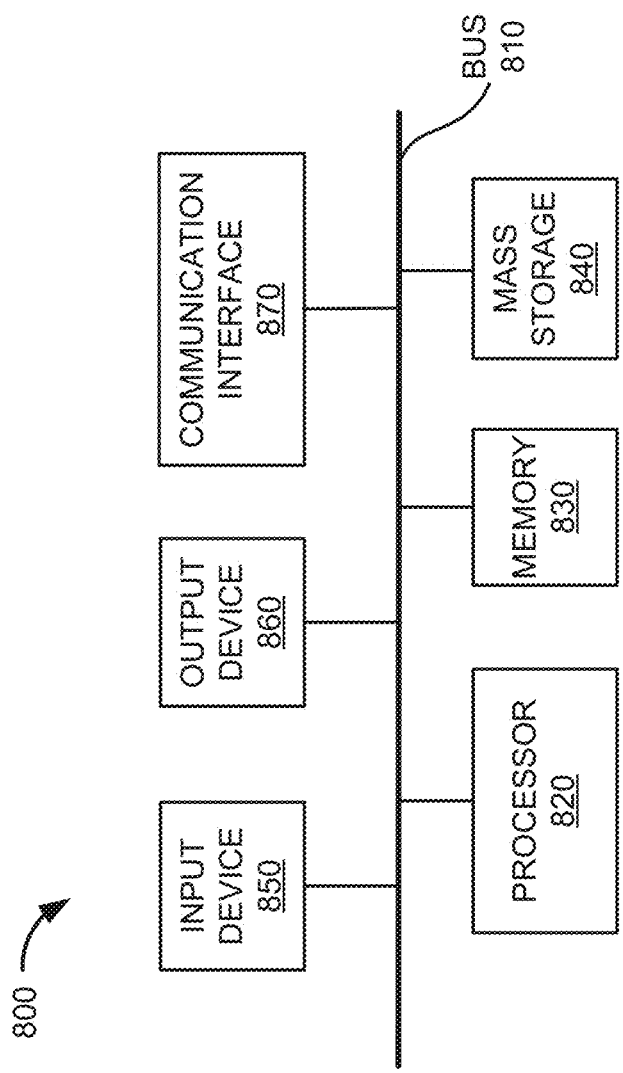
FIG. 8 is a block diagram of exemplary components of a device that may correspond to one of the devices of FIGS. 1-3.

FIG. 8 is a block diagram showing exemplary components of a network element 800, which may correspond to any one of UE 102, content source 104, eNodeB 108, network analytics system 150, dynamic auctioning system 160, CSR 205, BR 215, PCRF 220, MME 225, HSS 230, SGW 235, PGW 240, HRQC table module 310, dynamic costing engine 320, customer QoS management system 330, or billing system 710. Network element 800 may include a bus 810, a processor 820, a memory 830, mass storage 840, an input device 850, an output device 860, and a communication interface 870.

Bus 810 includes a path that permits communication among the components of network element 800. Processor 820 may include any type of single-core processor, multi-core processor, microprocessor, latch-based processor, and/or processing logic (or families of processors, microprocessors, and/or processing logics) that interprets and executes instructions. In other embodiments, processor 820 may include an application-specific integrated circuit (ASIC), a field-programmable gate array (FPGA), and/or another type of integrated circuit or processing logic. For example, processor 820 may be an x86 based CPU, and may use any operating system, which may include varieties of the Windows, UNIX, and/or Linux. Processor 820 may also use high-level analysis software packages and/or custom software written in any programming and/or scripting languages for interacting with other network entities are communicatively coupled to network environment 100.

Memory 830 may include any type of dynamic storage device that may store information and/or instructions, for execution by processor 820, and/or any type of non-volatile storage device that may store information for use by processor 820. For example, memory 830 may include a RAM or another type of dynamic storage device, a ROM device or another type of static storage device, and/or a removable form of memory, such as a flash memory. Mass storage device 840 may include any type of on-board device suitable for storing large amounts of data, and may include one or more hard drives, solid state drives, and/or various types of arrays.

Input device 850 can allow an operator to input information into network element 800, if required. Input device 850 may include, for example, a keyboard, a mouse, a pen, a microphone, a remote control, an audio capture device, an image and/or video capture device, a touch-screen display, and/or another type of input device. In some embodiments, network element 300 may be managed remotely and may not include input device 850. Output device 860 may output information to an operator of network element 800. Output device 860 may include a display (such as an LCD), a printer, a speaker, and/or another type of output device. In some embodiments, network element 800 may be managed remotely and may not include output device 860.

Communication interface 870 may include a transceiver that enables network element 800 to communicate with other devices and/or systems. The communications interface 870 may be configured for wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 870 may include a logical component that includes input and/or output ports, input and/or output systems, and/or other input and output components that facilitate the transmission/reception of data to/from other devices. For example, communication interface 870 may include a network interface card (e.g., Ethernet card) for wired communications and/or a wireless network interface (e.g., a Wi-Fi) card for wireless communications.

As described herein, network element 800 may perform certain operations relating to monitoring/data collection operations (e.g., network analytics system 150), server operations (e.g., PCRF 220, MME 225), gateway operations (e.g., SGW 235, PGW 240), and/or providing user subscription and service information (e.g., HSS 230, dynamic costing engine 320). Network element 800 may perform these operations in response to processor 820 executing software instructions contained in a computer-readable medium, such as memory 830 and/or mass storage 840. The software instructions may be read into memory 830 from another computer-readable medium or from another device. The software instructions contained in memory 830 may cause processor 820 to perform processes described herein. Alternatively, hardwired circuitry may be used in place of, or in combination with, software instructions to implement processes described herein. Thus, implementations described herein are not limited to any specific combination of hardware circuitry and software.

Although FIG. 8 shows exemplary components of network element 800, in other implementations, network element 800 may include fewer components, different components, additional components, or differently-arranged components than depicted in FIG. 8.

Figure 9:
FIG. 9 is a flow chart of an exemplary process for auctioning unused network capacity via a self-service portal according to implementations described herein.

FIG. 9 is a flow chart of an exemplary process 900 for auctioning and/or offering unused network capacity via a self-service portal, according to implementations described herein. In one implementation, process 900 may be performed by one or more devices of dynamic auctioning system 160. In another implementation, some or all of process 900 may be performed by another device or group of devices, including or excluding devices of dynamic auctioning system 160. For example, some parts of process 900 may be performed by network analytics system 150 in conjunction with dynamic auctioning system 160.

As shown in FIG. 9, process 900 may include collecting network capacity data (block 910), and tracking network capacity data on a per-segment and per-QCI basis (block 920). For example, dynamic auctioning system 160 (e.g., HRQC table module 310) may communicate with network analytics system 150 to receive including a packet delay (PD) and packet error rate (PER) data for each of multiple segments in infrastructure network 110. Performance (e.g., PD and PER) of each type of packet (e.g., as designated by each different QCI value) may be tracked across each segment.

Process 900 may further include building a cost matrix for the tracked network segments (block 930). For example, dynamic costing engine 320 may retrieve network capacity data from HRQC table module 310 and identify available capacity in each segment. Dynamic costing engine 320 may identify a price for the unused capacity and apply a segment cost factor (e.g., based on segment location and local factors), as illustrated in data structure 500. The price for the unused capacity across a segment may vary based on the amount of capacity available, such that segments with greater available capacity may be priced lower to incentivize service upgrades.

Process 900 may also include identifying relevant segments and a time window of a potential service upgrade for a particular subscriber (block 940). For example, dynamic auctioning system 160 (e.g., customer QoS management system 330) may identify a collection of segments (or a network path) in infrastructure network 110 to service the subscriber. Customer QoS management system 330 may also receive user input to identify a time period (for a temporary service upgrade) of interest to the subscriber. In one implementation, customer QoS management system 330 may use information from network analytics system 150, HRQC table module 310, and/or dynamic costing engine 320 to identify the particular subscriber traffic patterns, such as the exact paths they are consuming/using in the network (e.g., infrastructure network 110), the precise network elements on those paths, any excess capacity, and computed pricing models based on how much excess capacity there exists for those periods of time. In another implementation, customer QoS management system 330 may solicit additional details from the subscriber to determine a relevant path for a particular application or ADF.

Process 900 may further include generating upgrade pricing for the relevant segments and time window (block 950), and presenting pricing and QoS data of an upgrade option for the relevant segments and time window (block 960). For example, dynamic auctioning system 160 (e.g., customer QoS management system 330) may extract from the costing matrix of dynamic costing engine 320 the price of each individual segment in the subscriber's network path. Customer QoS management system 330 may present to the subscriber (e.g., using user device 705) a user interface that includes the subscriber's current subscription information and a projection of capacities (e.g., projection latencies for different types of packets) for the user's selected period using different service levels (e.g., Bronze, Silver, Gold, etc.).

Process 900 may also include receiving a user's selection of an upgrade option (block 970) and provisioning the network for upgraded service for the relevant segments and time window (block 980). For example, dynamic auctioning system 160 (e.g., customer QoS management system 330) may receive the subscriber's selection from user interface 600 and, in response, may send configuration information to PCRF 220 for provisioning and approval. Upon confirmation from PCRF 220, customer QoS management system 330 may update the new network QoS commitment (e.g., in QoS specifications storage 250) and send provisioning instructions to HSS 230, and provide the service at the new level.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

It will be apparent that different embodiments described above may be implemented in many different forms of software, firmware, and hardware in the implementations illustrated in the figures. The actual software code or specialized control hardware used in the implementations does not limit the invention. Thus, the operation and behavior of these embodiments were described without reference to the specific software code—it being understood that software and control hardware can be designed to implement these embodiments based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
receiving, by one or more network devices utilization information for an infrastructure network, wherein the utilization information provides data for individual segments of the infrastructure network;
generating, by the one or more network devices, a costing matrix that includes prices for each segment of the individual segments, wherein the costing matrix is based on the data for the individual segments;
identifying, by the one or more network devices, particular segments of the infrastructure network associated with an end-to-end path for a subscriber;
generating, by the one or more network devices, pricing of different service levels for the end-to-end path, wherein the pricing is based on the costing matrix and a particular time period;
providing, by the one or more network devices and to the subscriber, a user interface that includes service plan options with the pricing of the different service levels for the end-to-end path;
receiving, by the one or more network devices and via the user interface, a selection of one of the service plan options; and
sending, by the one or more network devices, instructions to provision the infrastructure network to support the selected one of the service plan options.

2. The method of claim 1, wherein the data for the individual segments includes real-time or near-real-time transport capacity data.

3. The method of claim 1, wherein the data for the individual segments includes at least one of a packet delay or a packet error rate for each of the individual segments.

4. The method of claim 1, further comprising:
identifying, by the one or more network devices and based on input from the subscriber, the particular time period, wherein the time period indicates a temporary service window.

5. The method of claim 4, further comprising:
projecting, by the one or more network devices and based on the data for the individual segments, latency over the end-to-end path for multiple service plans during the temporary service window, wherein the user interface further indicates the latency over the end-to-end path for the multiple service plans during the temporary service window.

6. The method of claim 5, wherein the user interface further indicates the latency over the end-to-end path for different quality of service (QoS) class identifier (QCI) values for the multiple service plans during the temporary service window.

7. The method of claim 1, wherein the costing matrix is further based on regional factors associated with particular individual segments.

8. The method of claim 1, wherein the data for the individual segments includes at least one of a packet delay or a packet error rate for different quality of service (QoS) class identifier (QCI) values for each of the individual segments.

9. The method of claim 1, wherein the prices for each segment of the individual segments in the costing matrix are based on applying higher prices to more heavily utilized segments and lower prices to less heavily utilized segments.

10. The method of claim 1, wherein the user interface solicits the particular time period from the subscriber.

11. The method of claim 1, wherein sending instructions to provision the infrastructure network comprises:
sending, in response to receiving the selection of one of the service plan options, provisioning information for the selected one of the service plan options to a policy charging rules function (PCRF) device and a home subscriber server (HSS) device; and
sending an indication of the selected one of the service plan options to a billing system.

12. A network device, comprising:
a memory configured to store a plurality of instructions; and
a processor configured to execute instructions in the memory to:
receive utilization information for an infrastructure network, wherein the utilization information provides data for individual segments of the infrastructure network;
generate a costing matrix that includes prices for each segment of the individual segments, wherein the costing matrix is based on the data for the individual segments;
identify particular segments of the infrastructure network associated with an end-to-end path for a subscriber;
generate pricing of at least one different service level for the end-to-end path, wherein the pricing is based on the costing matrix and a particular time period;
provide, to the subscriber, a user interface that includes at least one service plan option with the pricing of the at least one different service level for the end-to-end path;
receive, via the user interface, a selection of a service plan option; and send instructions to provision the infrastructure network to support the selected service plan option.

13. The network device of claim 12, wherein the data for the individual segments includes one or more of a packet delay or a packet error rate for each of the individual segments.

14. The network device of claim 12, wherein the processor is further configured to:
identify the particular time period to the subscriber, wherein the time period indicates a temporary service window.

15. The network device of claim 14, wherein the processor is further configured to:
project, based on a moving average of the data for the individual segments over the length of the time period, latency over the end-to-end path for multiple service plans during the temporary service window.

16. The network device of claim 15, wherein the processor is further configured to:
provide, via the user interface, the latency over the end-to-end path for different quality of service (QoS) class identifier (QCI) values for the multiple service plans during the temporary service window.

17. The network device of claim 12, wherein the data for the individual segments includes one or more of a packet delay or a packet error rate for different quality of service (QoS) class identifier (QCI) values for each of the individual segments.

18. A non-transitory computer-readable medium storing instructions executable by a computational device to:
generate a costing matrix that includes prices for individual segment of an infrastructure network, wherein the costing matrix is based on utilization data for each of the individual segments;
identify particular segments of the infrastructure network associated with an end-to-end path for a subscriber;
generate pricing of different service levels for the end-to-end path, wherein the pricing is based on the costing matrix and a particular time period;
provide, to the subscriber, a user interface that includes service plan options with the pricing of the different service levels for the end-to-end path;
receive, via the user interface, a selection of one of the service plan options; and
send instructions to provision the infrastructure network to support the selected one of the service plan options.

19. The non-transitory computer-readable medium of claim 18, further comprising instructions to:
receive the utilization data for the infrastructure network in real-time or near-real-time.

20. The non-transitory computer-readable medium of claim 18, wherein the utilization data for each of the individual segments includes packet delay information for different quality of service (QoS) class identifier (QCI) values used over each of the individual segments.

* * * * *